April 14, 1964     A. O. SYKES     3,128,978
VIBRATION CANCELLING ISOLATION MOUNTS
Filed June 10, 1960     4 Sheets-Sheet 1

INVENTOR
ALAN O. SYKES
BY
ATTORNEYS

April 14, 1964  A. O. SYKES  3,128,978
VIBRATION CANCELLING ISOLATION MOUNTS
Filed June 10, 1960  4 Sheets-Sheet 2

INVENTOR
ALAN O. SYKES
BY
ATTORNEYS

April 14, 1964  A. O. SYKES  3,128,978
VIBRATION CANCELLING ISOLATION MOUNTS
Filed June 10, 1960  4 Sheets-Sheet 4

INVENTOR
ALAN O. SYKES

BY
ATTORNEYS

United States Patent Office 3,128,978
Patented Apr. 14, 1964

3,128,978
VIBRATION CANCELLING ISOLATION MOUNTS
Alan O. Sykes, 304 Mashie Drive SE., Vienna, Va.
Filed June 10, 1960, Ser. No. 35,382
10 Claims. (Cl. 248—22)
(Granted under Title 35, U.S. Code (1952), sec. 266)

The invention described herein may be manufactured and used by or for the Government of the United States of America for governmental purpose without the payment of any royalties thereon or therefor.

The present invention relates to vibration reducing mounts and more particularly to mounts which are designed for reduction of vibrations of predetermined frequencies.

Isolation mounts for reducing the transmission of vibration from a machine to a foundation or another machine or from foundation to machine, are in use in many types of devices. Standard engineering practice utilizes metal or rubber springs for these purposes with the intention that the mount will reduce the force exerted on the machine or foundation or whatever else may be attached to opposite ends of the mount. In general, when resonant effects involving the combined machine-mount-foundation system and wave propagation in the mount are excluded, the softer the mount, the more isolation it provides.

Conventional mounts suffer, however, from several disadvantages which may or may not be serious depending upon the device in which the mount is to be utilized. First, no matter how soft a mount is, some force is transmitted through it. Further, the amount of isolation provided by a particular mount is dependent not only on the characteristics of the mount, but also on the characteristics of both the machine and the foundation. Also, because of shock, stability, and supporting considerations it may not be possible to provide a mount which is as soft as isolation requirements dictate.

The present invention avoids the disadvantages inherent in conventional mounts by effectively cancelling all or substantially all vibration in one or more narrow bands of frequencies. This is accomplished by providing two parallel paths in each mount, for transmission of vibratory forces, with the elements of the two paths so chosen that cancellation of the forces transmitted through them occurs.

An object of the present invention is the provision of a mount which will isolate a device attached to one end from particular frequencies of vibration introduced at its other end.

A further object is to provide an isolation mount which cancels vibration at discrete frequencies.

Still another object is the provision of an isolation mount which will effectively and simply isolate a machine from its foundation at particular frequencies of vibration.

Other objects and many of the attendant advantages of this invention will be readily appreciated as the same becomes better understood by reference to the following detailed description when considered in connection with the accompanying drawings wherein.

Figure 1:
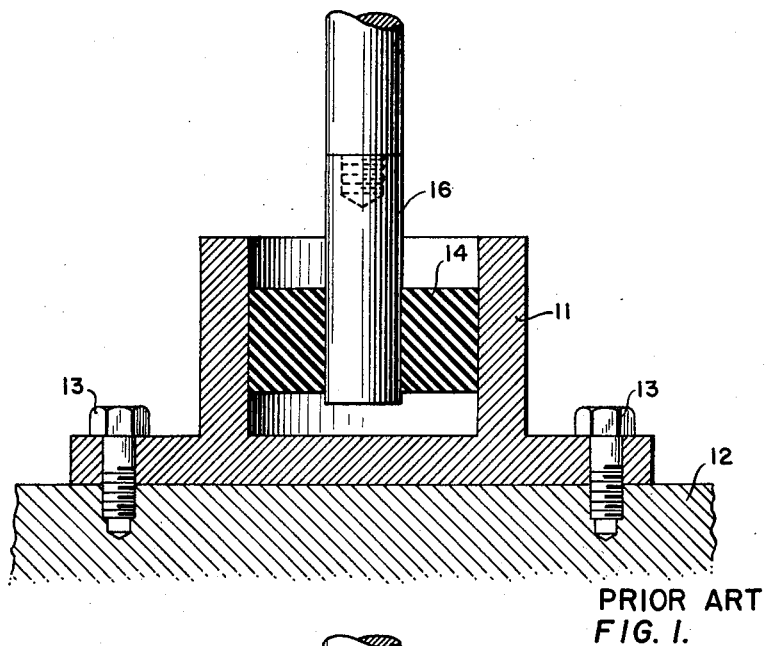
FIG. 1 is an elevational view, partly in section, representative of a conventional vibration mount.

Referring now to the drawings, wherein like reference numerals designate like or corresponding parts throughout the several views, there is shown in FIG. 1 a base support member 11 secured to a base or foundation 12 by a plurality of bolts 13. It will be realized that any suitable means may be used in place of bolts 13 for securing the support member to the base or the support member may be formed as part of the base.

Mounted on support 11 by means of resilient ring 14, which may be rubber or the like, or a metallic spring, is a machine support member 16 to which the machine is attached. It will be realized that the mount may have any desired shape and is not limited to the circular shape shown in the drawing.

The mount of FIG. 1 is representative of a conventional type mount for reducing machinery vibration. The resilient material is chosen to be as soft as possible, within the strength required, to reduce transmission to a minimum. However complete isolation between the machinery and its foundation is impossible since although a portion of the vibration is absorbed, a portion is also transmitted through the material. In many applications this is undesirable.

Figure 2:
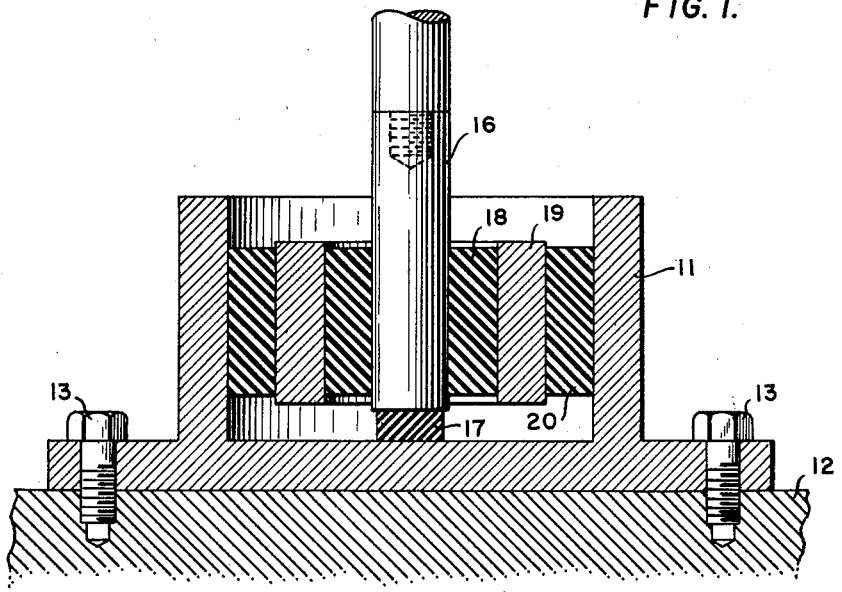
FIG. 2 is an elevational view, partly in section, of an embodiment of the present invention.

FIG. 2 shows a mount, made in accordance with the present invention, of the same general type as that shown in FIG. 1. The mount shown in FIG. 2, however, is designed to cancel all vibration at a particular frequency. Again there is shown an end terminal which may be a base support member 11 firmly mounted on a base or foundation 12 and a second end terminal which may be a machinery support member 16 carried by the base support member 11 but spaced therefrom. The mount is again shown as being cylindrically symmetrical but is not limited to this shape.

Interposed between the end of the machinery support member 16 and the base support member 11 is a cylindrical resilient element 17 which may be rubber or the like or alternatively may be a metal spring. Surrounding machinery support member 16 and interposed between it and the cylindrical inner wall of the base support member 11 are three concentric rings 18, 19, 20. Rings 18 and 20 are formed of resilient material, but the ring 19, disposed between the other two rings and concentric therewith, is a ring mass or annulus which may be of metallic material. The mount may be designed to cancel vibration in the direction of the axis of the mount or vertically as shown in FIG. 2; and it may also be used for cancelling rotational vibrations about the vertical axis.

Figure 3:
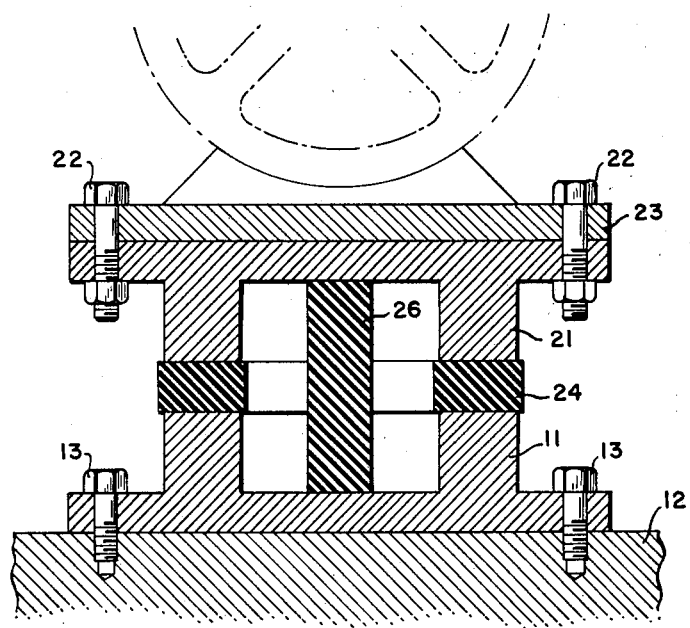
FIG. 3 is an elevational view, partly in section, of a second embodiment of this invention.

FIG. 3 illustrates another embodiment of the invention designed for cancelling vibrations in predetermined frequency bands. In this embodiment as illustrated, there is again shown a base support member 11 secured to a base 12 by means of bolts 13 or the like. At the top of the mount is a machine support member 21 secured by means of bolts 22 to a machine base 23. Interposed between base support member 11 and machine support member 21 is an annular resilient ring 24 and a second resilient element 26 which may be rod shaped and has sufficient length to act as a mechanical transmission line.

Figure 4:
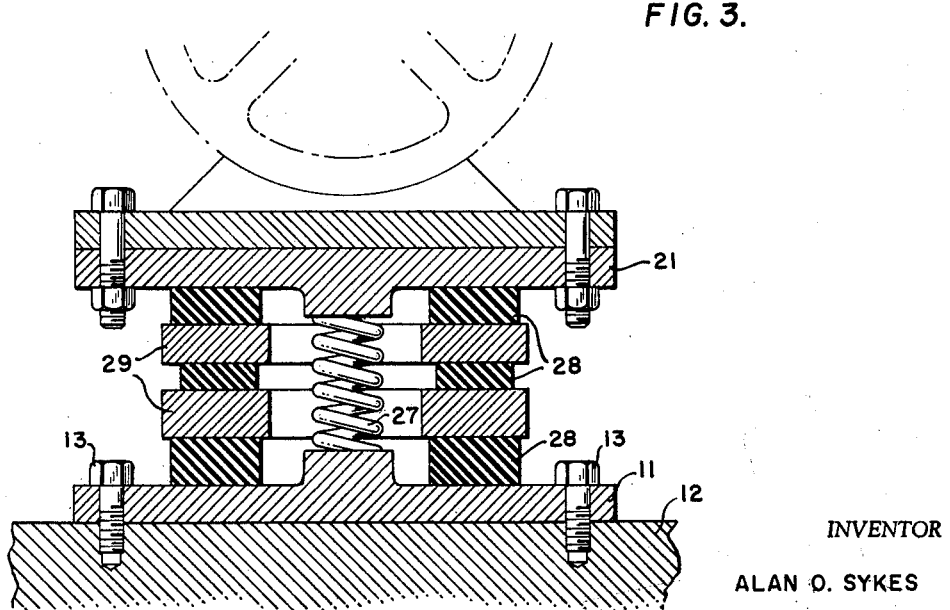
FIG. 4 is an elevational view, partly in section, of a modification of the embodiment shown in FIG. 2.

FIG. 4 is a modification of FIG. 3 designed for elimination of vibrations at two distinct frequencies. Between the base support member 11 and the machinery support member 21, there are again provided a pair of mechanically parallel paths for vibration transmission between the two support members. A cylindrical resilient member 27, which is shown in FIG. 4 as a metal coil spring but which may alternatively be formed of rubber or other resilient material in any desired shape, forms one transmission path. The other transmission path comprises a series of alternating cylindrical rings 28, 29. Rings 28 are formed of resilient material such as rubber or the like, while rings 29, interposed alternately between rings 28, are rigid ring masses which may be made of metallic material.

Each of the vibration cancelling mounts has two mechanically parallel paths for transmission of vibration or noise between machine and foundation. In FIG. 2, one path is through resilient element 17 and the other is through concentric rings 18, 19 and 20. In FIG. 3, one path is through ring 24 while the second path is through rod 25. In FIG. 4, one path is through resilient element 27 while the other is through the alternating rings 28 and 29.

In accordance with the invention it is necessary, in order to obtain cancellation of vibrations at a given frequency to select the components in these two paths so that the vibratory forces or torques transmitted through them are equal in magnitude but displaced 180 degrees in phase, or stated another way, the resultant force or torque transmitted through the two parallel paths must be equal to zero.

Resilient mount elements may be described as essentially massless damped springs or alternatively, as transmission lines, depending upon the physical characteristics of the elements and the vibration frequencies against which the mount is to isolate.

The essentially massless damped spring may be described as a parallel spring-dashpot combination in terms of stiffness K and resistance R. This combination has been found to be adequate for design if the frequencies of the exciting forces are low enough so that wave effects in the mount become negligible; in other words the mount acts as a linear spring, and inertia forces associated with the mount can be neglected.

At higher frequencies the resilient element must be considered as a transmission line, or an extended mechanical system with distributed mass and elasticity through which mechanical energy can be propagated by elastic waves. This occurs when the length, or longest physical dimension, of the element approaches the same order of magnitude as the wavelength of the disturbance being transmitted by the structure.

The resilient elements 17, 18, 20, 27 and 28 of the embodiments shown in FIGS. 2 and 4 act essentially as massless damped springs, while in the embodiment shown in FIG. 3 element 26 is of such a length as to act as a mechanical transmission line while element 24 can be chosen to act either as a massless damped spring or a mechanical transmission line. The masses 19 (FIG. 2) and 29 (FIG. 4) are primarily responsible for the phase and amplitude changes in the forces transmitted through the paths containing them.

Figure 5:
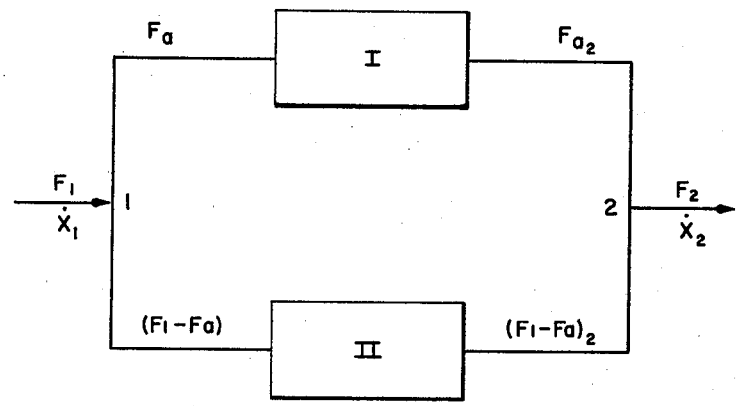
FIG. 5 is a block diagram of the mechanical circuit of the mounts shown in FIGS. 2–4.

In FIG. 5 there is shown a block diagram representing the system of the present invention and applicable to each of FIGS. 2, 3 and 4. The mechanically parallel elements are designated as I and II and are so constrained in each mount that when a vibratory force of complex amplitude $F_1$ is applied to the combination at terminal 1, the ends adjacent terminal 1, of elements I and II both move with a vibratory velocity of complex amplitude $X_1$, and the ends adjacent terminal 2 move with a vibratory velocity of complex amplitude $X_2$. $F_2$ is the complex amplitude of the total force transmitted through elements I and II and in accordance with the invention is equal to zero for the frequency or frequencies at which vibration cancellation is desired.

Suppose now that terminal 2 is blocked, i.e., held fixed so that vibratory velocity at terminal 2 is zero at all times. Assuming $F_a$ as being the force applied to one of the parallel elements I or II, the force applied to the other will be $(F_1-F_a)$. $Z_{I2b}$ and $Z_{II2b}$ are the impedances of I and II looking into them at their left terminals with their right terminals blocked. Then $$F_a = X_1 Z_{I2b} \quad (1)$$

and $$(F_1 - F_a) = X_1 Z_{II2b} \quad (2)$$

assuming $F_{a2}$ as the force transmitted through element I, $(F_1-F_a)_2$ as the force transmitted through element II, and $T_I$ and $T_{II}$, the force transmissibilities of elements I and II respectively are defined as $$T_I = \frac{F_{a2}}{F_a} \quad (3)$$

and $$T_{II} = \frac{(F_1-F_a)_2}{(F_1-F_a)} \quad (4)$$

or $$F_{a2} = T_I F_a \quad (5)$$

and $$(F_1-F_a)_2 = T_{II}(F_1-F_a) \quad (6)$$

Substituting Equations 1 and 2 in Equations 5 and 6 respectively, $$F_{a2} = T_I X_1 Z_{I2b} \quad (7)$$

and $$(F_1-F_a)_2 = T_{II} X_1 Z_{II2b} \quad (8)$$

For cancellation at any given specific frequency, $$F_{a2} = -(F_1-F_a)_2 \quad (9)$$

Substituting Equations 7 and 8 in Equation 9

$$Z_{I2b} T_I = -Z_{II2b} T_{II} \quad (10)$$

or $$T_I Z_{I2b} + T_{II} Z_{II2b} = 0 \quad (11)$$

provided that $$Z_{I2b} + Z_{II2b} \neq 0$$

Figure 6:
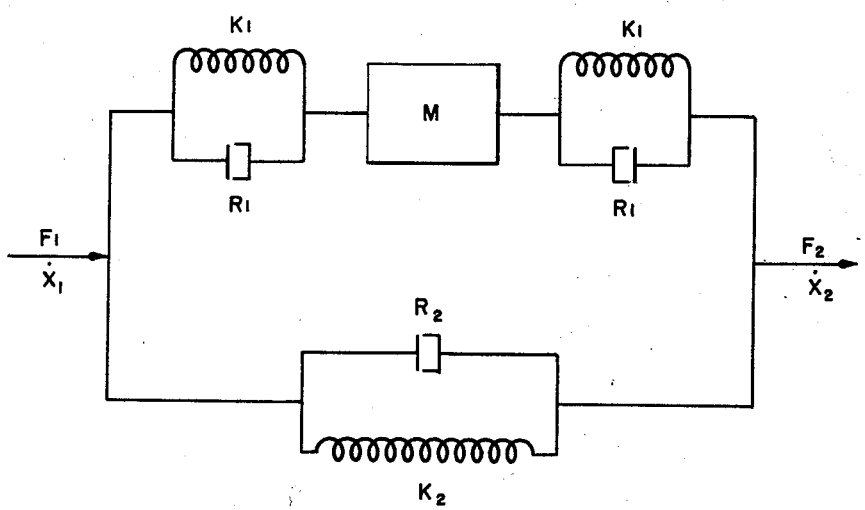
FIG. 6 is a mechanical equivalent circuit of the mount shown in FIG. 2.

FIG. 5 is the general diagram of all three illustrated mounts; FIG. 6 is the equivalent of FIG. 5 referred specifically to the elements of the mount shown in FIG. 2. Referring now to FIG. 6 there is shown, for illustrative purposes, a mechanical circuit of the mount shown in FIG. 2 wherein $R_1$ and $R_2$ are mechanical resistances; $R_1$ being the resistance of each of the elements 18 and 20, and $R_2$ being the resistance of element 17.

$K_1$ and $K_2$ are stiffnesses of the resilient elements 18 and 20 and 17, respectively.

$M_1$ is the mass of ring mass 19.

It will be realized that although $K_1$ and $R_1$ are taken as the resistances and stiffnesses respectively of each of elements 18 and 20, the elements need not in practice be identical. Making them identical, however, simplifies calculation.

For simplicity let $$\sqrt{\frac{2K_1}{M_1}} = \omega_a$$

$$r_1 = \frac{\omega R_1}{K_1}, \; r_2 = \frac{\omega R_2}{K_2}$$

where $\omega$ is the variable circular frequency in radians per second, and $$k = \frac{K_1}{K_2}$$

For a particular design circular frequency $\omega_c = 2\pi f_c$ where $f_c$ is the vibration frequency in cycles per second at which cancellation is desired, and $\omega_c$ is the design circular frequency in radians per second it can be shown from Equation 11 that if $F_2=0$ as required for complete cancellation at the design vibration frequency $f_c$, the following equations must be satisfied:

$$\left(\frac{\omega_c}{\omega_a}\right)^2 = 1 + \frac{r_1}{r_2}(1+k) \quad (12)$$

and $$\frac{r_1}{r_2} = \frac{-1}{k}\left[1 + \frac{1+k}{r_2^2}\right] + \sqrt{\left\{\frac{1}{k}\left[1 + \frac{1+k}{r_2^2}\right]\right\}^2 + \frac{1}{r_2^2}} \quad (13)$$

The phase difference in the vibratory force transmitted through the two paths occurs as a consequence of the mass in path I. This can be seen most easily in the limiting case wherein both $R_1$ and $R_2$ are 0. In this case, the vibratory force transmitted through path II and experienced at terminal 2 of path II is in phase with the vibratory force applied at terminal 1 of path II, whereas at circular frequencies $\omega$ greater than $$\omega = \sqrt{\frac{K_1}{M_1}}$$

the force transmitted through path I and experienced at terminal 2 of path I is 180 degrees out of phase with the force applied at terminal 1 of path I.

This follows from the transmissibilities of paths I and II, $$T_{II} = 1$$

$$T_I = \frac{\frac{-K_1}{\omega}}{\omega M_1 \frac{-K_1}{\omega}}$$

which can be derived from Equations 3 and 4 by applying the rules of mechanical network theory. Thus, by measuring the vibration frequency to be cancelled and utilizing the known constants of available material a mount may be designed for isolating against vibrations of any desired frequency by meeting the conditions set forth in Equations 12 and 13.

Figure 7:
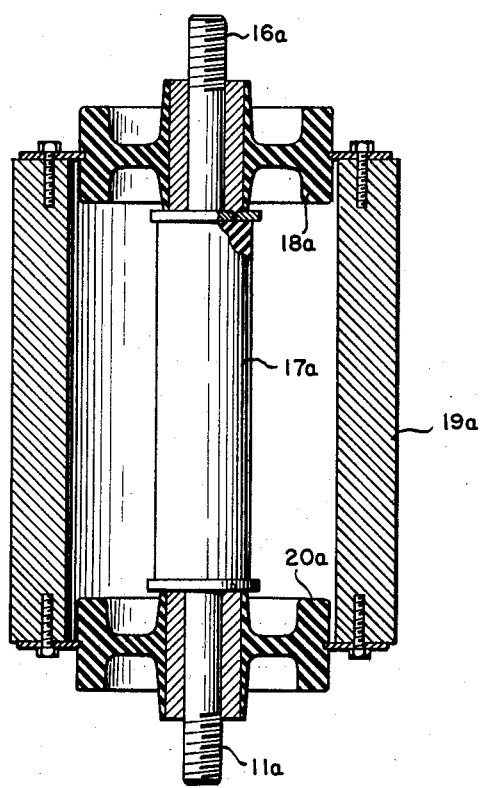
FIG. 7 is an elevated view, partly in section, of a modified embodiment of the type shown in FIG. 2.

Referring now to FIG. 7, there is shown a mount, similar to the mount shown in FIG. 2, which is designed specifically for cancellation of vibrations which have a frequency of 30 cycles per second. In this mount, resilient elements 18a and 20a are made of rubber and have measured values of $K=172$ lb./in. and $r=0.0690$. Resilient cylindrical rod 17a is also made of rubber and has measured values of $K=86.5$ lb./in. and a value of $r=0.112$. Ring mass 19a is a hollow brass cylinder which weighs 9.06 lbs. The base support member 11a and machine support member 16a are shown by way of example as being externally threaded for attachment of the mount between the base and the machine.

A similar mount was built using the same resilient elements but with a ring mass which weighed 5.14 pounds. This mount was designed for cancellation at 41 cycles per second. Experimentally it was found that using the same resilient elements and substituting masses of different weights, for cancellation at 30 and 41 c.p.s., masses of 8.85 lbs. and 4.50/lbs. respectively, were actually required. The difference between the calculated and required values is a result of the inherent inaccuracies present in the measurements of the values of K and r for the resilient elements. However, since substantial reduction is acquired over a band of frequencies around the design frequency a substantial improvement in isolation was obtained over conventional type mounts at the design frequency and by experiment cancellation at precisely the design frequency is obtainable.

Referring again to FIG. 5, for the case, as exemplified by the mount shown in FIG. 3, where element I is a massless damped spring of resistance R and stiffness K, and element II is a transmission line of length L, cross-sectional area S, complex elastic modulus E, propagation constant $\gamma = \alpha + j\beta$ where $\alpha$ is the attenuation per unit length and $\beta$ is the phase constant of the element, then the conditions for $F_2 = 0$ at a particular design frequency $\omega_c$ can be found by substituting:

$$T_I = 1 \quad (14)$$

$$T_{II} = \frac{1}{\cosh \gamma L} \quad (15)$$

$$Z_{I_{2b}} = R - j\frac{K}{\omega_c} \quad (16)$$

$$Z_{II_{2b}} = \frac{E\gamma S}{\omega_c} \coth \gamma L \quad (17)$$

in Equation 11.

For the case that both I and II are transmission lines, two pairs of equations similar to 15 and 17 must be substituted in Equation 11.

Each of the mounts described features a pair of paths for transmission of vibratory forces or torques from machine to foundation or vice versa. The elements of the paths are chosen to cancel the forces or torques at the design frequency and will considerably reduce vibrations having frequencies which lie in a band around the design frequency. At and near the design frequencies, the isolation provided by the invention is independent of the mechanical characteristics of the machine and foundation or any other elements which may be attached to opposite ends of the mount. Further the mount may be designed so that above the design cancellation frequency it reduces vibration transmission to a point much lower than is possible for a conventional mount having the same static stiffness, or capable of supporting an equal load. For ease in assembly and to prevent shifting of the element of the mount relative to one another, the various elements may be bonded together and to the support members between which they are placed.

This is accomplished by making the resilient elements in the transmission path containing the inertia elements, e.g., elements 18 and 20 of FIG. 2, element 26 of FIG. 3, or elements 28 of FIG. 4 stiff enough to essentially support the static load the mount must carry, thereby making it possible to have the resilient element in the other transmission path very much softer, it being the stiffeners of this element in the second transmission path which determines the isolation the mount provides at frequencies above the mount's cancellation frequency.

Obviously many modifications and variations of the present invention are possible in the light of the above teachings. It is therefore to be understood that within the scope of the appended claims the invention may be practiced otherwise than as specifically described.

What is claimed is:

1. A vibration cancelling mount comprising a pair of resilient elements mounted in mechanically parallel relationship, said pair of resilient elements including means for introducing a 180 degree phase shift in vibrations transmitted through one of said elements relative to vibrations transmitted through the other of said pair of elements.

2. A vibration cancelling mount comprising a pair of elements of resilient material wherein one of said pair of resilient elements acts as a mechanical transmission line and the other of said pair of elements acts as an essentially massless damped spring.

3. An isolation mount for cancelling transmitted vibrations of a predetermined frequency comprising a pair of mechanically parallel elements of resilient material each having a first and second terminal wherein the elements of the pair are so chosen that:

$$T_I Z_{I_{2b}} + T_{II} Z_{II_{2b}} = 0$$

where $T_I$ and $T_{II}$ are the transmissivities of the two elements of said pair and $Z_{I_{2b}}$ and $Z_{II_{2b}}$ are the mechanical impedances of the two elements of said pair, both transmissivities and both impedances being taken from said first terminal with said second terminal held fixed so that the vibratory velocity at said second terminal is equal to zero at said predetermined frequency.

4. An isolation mount for cancelling transmitted vibrations at one or more predetermined frequencies and reducing vibration transmission at other frequencies comprising first and second mechanically parallel elements, said first and second elements having common end terminals and comprising means for transmitting vibrations from a first of said common end terminals to the second in a manner such that the sum of the vibratory forces transmitted through said elements to the second terminal is zero at said predetermined frequency, whereby vibrations at said predetermined frequencies are cancelled.

5. The invention as defined in claim 4 wherein said first element is a resilient element which acts as a mechanical transmission line and said second element is a resilient element which acts as a substantially massless damped spring.

6. The invention as defined in claim 4 wherein said first element is a resilient element which acts as a substantially massless damped spring and said second element comprises a pair of resilient elements which act as substantially massless damped springs separated by and in contact with a substantially rigid mass, whereby said mass introduces a phase shift in one of said first and second elements relative to the other of said elements.

7. The invention as defined in claim 4 wherein said first element is a resilient element which acts as a substantially massless damped spring and said second element comprises a plurality of resilient elements which act as substantially massless damped springs, each of said plurality of resilient elements being separated from the next resilient element by a substantially rigid mass.

8. A vibration reducing mount having a design cancellation frequency and having two ends comprising a pair of resilient transmission paths between said two ends, a first of said paths including inertia elements and the other of said transmission paths being more resilient than said first path whereby the load on the mount is substantially supported by said first path thereby allowing the more resilient path to reduce transmission of vibration from one end of said mount to the other of said ends at frequencies above the design cancellation frequency of the mount.

9. A vibration cancellation mount for canceling vibrations at at least one design frequency, said mount comprising means providing at least two paths for transmission of vibrations, a common inlet and a common outlet for said paths, said means comprising a plurality of mechanical elements having characteristics of vibration transmission and of mechanical impedance providing essentially equal and opposite vibrational forces at said outlet at said design frequency.

10. A vibration cancelling isolation mount for isolating vibrating equipment from its foundation at at least one design frequency of vibration, said mount comprising means providing at least two mechanically parallel paths coupling the equipment to the foundation, said means comprising a plurality of elements having characteristics of vibration transmission and of mechanical impedance providing essentially equal but opposing vibration forces at the foundation at said design frequency.

References Cited in the file of this patent

UNITED STATES PATENTS

| | | |
|---|---|---|
| Re. 23,743 | Lambert et al. | Nov. 24, 1953 |
| 2,519,702 | Robinson | Aug. 22, 1950 |
| 2,549,037 | Withall | Apr. 17, 1951 |
| 2,638,303 | Pietz | May 12, 1953 |
| 2,762,600 | Mordarski et al. | Sept. 11, 1956 |